Oct. 23, 1945.　　　A. N. SPANEL　　　2,387,539
FLEXIBLE COLLAPSIBLE FLUID BLADDER
Filed May 7, 1943
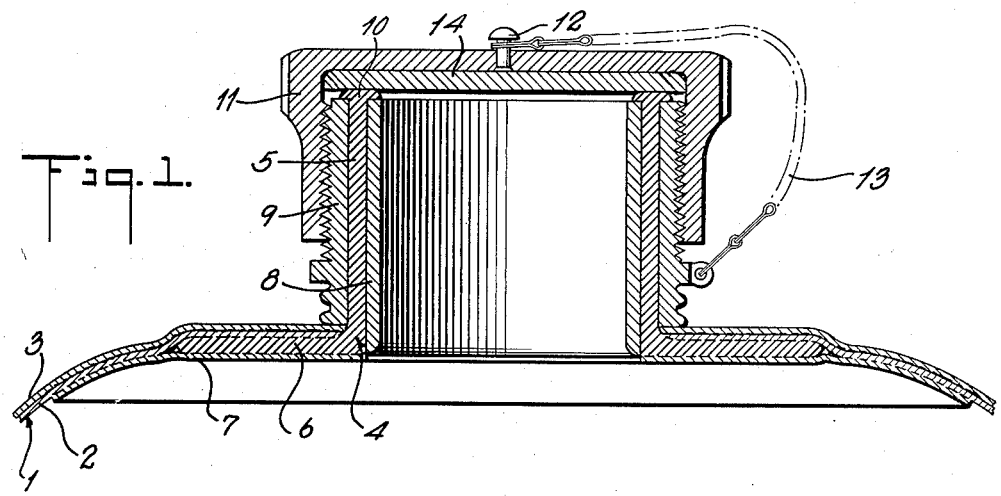
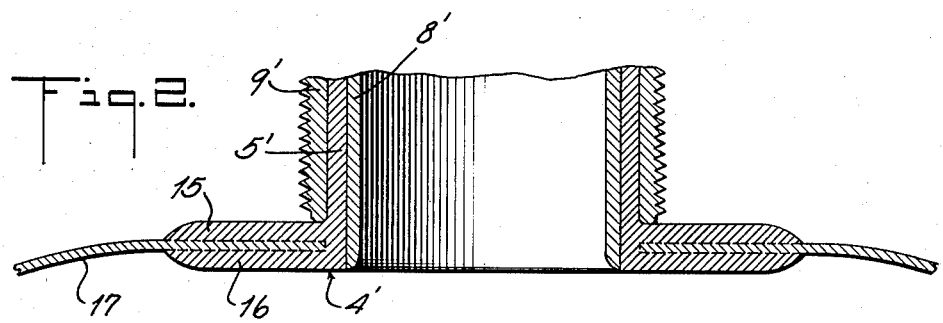
INVENTOR
ABRAHAM N. SPANEL
BY
Ward Crosby & Neal
his ATTORNEY Patented Oct. 23, 1945

2,387,539

UNITED STATES PATENT OFFICE 2,387,539

FLEXIBLE COLLAPSIBLE FLUID BLADDER

Abraham N. Spanel, New York, N. Y.

Application May 7, 1943, Serial No. 486,031

6 Claims. (Cl. 285—38)

This invention relates to flexible, collapsible bladders for containing fluid. The invention is particularly adapted for and may be usefully employed in the making of inflatable articles, such as toys, life-saving equipment, pontoons and the like; as well as liquid containers, such as canteens and larger receptacles for holding and transporting liquids.

This application is a continuation in part of my copending application Serial No. 469,268, filed December 16, 1942, for "Flexible collapsible fluid containers and method of producing same" (now Patent No. 2,323,629, granted July 6, 1943), and as to certain subject matter is a division of said prior application. In said prior application there is disclosed and claimed bladders having a thermoplastic resinous side wall and method of making the same. The present invention is directed particularly to filling and closure features of such thermoplastic resinous bladders.

An object of the invention is to provide improved flexible collapsible bladders for containing fluid.

Another object of the invention is to provide such bladders having an attached filling tube and sturdy, dependable and easily operable closure means therefor, adapted to be produced economically.

The invention consists in the novel features, arrangements and combination of parts embodied by way of example in the devices hereinafter described as illustrating the preferred forms of the invention, and the invention will be more particularly pointed out in the appended claims.

Further objects, features and advantages of the invention will more clearly appear from the detailed description given below taken in connection with the accompanying drawing, which forms a part of the specification.

Referring to the drawing:

Fig. 1 is a somewhat enlarged sectional view showing details of construction of a form of the invention comprising a filling tube especially adapted for liquid and preferable for containers for holding liquid.

Fig. 2 is a similar view showing an embodiment in general like that of Fig. 1 but illustrating a variation thereof.

In said copending application Serial No. 469,-268, (now Patent No. 2,323,629, granted July 6, 1943) I have disclosed a bladder having a side wall of flexible sheet thermoplastic synthetic resinous material, such as vinyl resins, of which "vinylite" is an example; and other suitable thermoplastic resinous materials, such as vinyl butyrol, ethyl cellulose glycolate, "saran," and the like thermoplastic materials, may be similarly employed.

In certain embodiments of said bladder, said thermoplastic side wall is provided with an outer fabric lamination entirely surrounding it and integrally secured thereto at certain limited areas, including an annular zone around a filling opening. The present invention contemplates bladders of both the mere thermoplastic wall and the thermoplastic wall with an integrally secured fabric outer lamination. The formation of such bladder walls not being specifically claimed herein, they will only be designated in general.

Referring more particularly to Fig. 1, the body of the bladder is designated in general as 1, and in this embodiment is the laminated type of bladder above referred to and comprises a side wall 2 of said flexible thermoplastic resinous material and an outer lamination 3 of fabric. A flexible filling nipple, designated in general as 4, is provided with a tubular neck portion 5 and an inner outwardly extending flange or skirt portion 6. In the present embodiment, the nipple 4 is of molded thermoplastic material, preferably of the same character as that of which the side wall 2 is formed. The skirt 6 is disposed on the interior of the body 1 with its upper face contiguous the inner side of the side wall 2, and the neck 5 extends outwardly through the laminated walls of the bladder 1. A skirt, such as an annular disk 7 of sheet thermoplastic material, is disposed beneath the flange 6 with its upper face lying adjacent the lower face of said flange. The disk 7 is provided with a central opening in register with the opening of the tube 5 and is of larger diameter than that of flange 6 so as to extend outwardly therebeyond; the outwardly extending marginal edge lying contiguous the inner surface of the wall 2. The inner surface of the fabric lamination 3 is coated with a thermoactive material, such as "vinylite," for an area at least as great or greater than that correspond ing to the area defined between the opening in the bladder 1 through which the tube 5 passes and the external diameter of the skirt 7. With the parts thus disposed, heat and pressure are applied to the upper surface of the lamination 3 throughout the extent of the annular area defined by the external diameter of the tube 5 and the external diameter of the skirt 7, and to the inner surface of the skirt 7 throughout its area: to thereby cause the upper face of the disk 7 to be integrally fused to the lower face of flange 6, the upper face of the marginal edge of said skirt 7 to be fused to the overlying corresponding inner face of the thermoplastic side wall 2, the upper face of flange 6 to be fused to the overlying corresponding inner surface of the thermoplastic side wall 2, and the inner thermo-active coating of the fabric lamination 3 to be fused to the adjacent outer face of the thermoplastic side wall 2 throughout an area substantially corresponding to that of the disk 7. The temperature which I have successfully employed with the "vinylite" material in effecting fusion is 240°–260° F. for a period of 35–40 seconds at a pressure sufficient to seal the parts together, which pressure for "vinylite" may be of the general order of 1200–1800 pounds per square inch. In order to facilitate the fusion of the contiguous thermo-active faces, at perhaps lower than normal temperatures and/or pressures, it is beneficial to apply to the aforesaid faces to be fused a spray or thin coating of solvent, such as tricresyl phosphate, or dioctyl-phthalate, or a mixture of cyclohexanone and methyl ethyl ketone, or cyclohexanone, or methyl ethyl ketone.

Such fusion integrally unites the outer marginal edge of the disk 7 to the thermoplastic wall 2 to thereby provide a skirt portion integral with said wall 2 and having two plies or layers surrounding the opening through which the tubular portion or neck 5 extends; and the skirt portion 6, which is integral with the neck 5, is disposed between these two plies and is intimately secured thereto as by fusion of the thermoplastic contiguous surfaces. The fusion of these surfaces must be sufficient to provide at the fusion areas not only a fluid seal but a substantially unified structure.

A tubular sleeve 8 of relatively rigid material is disposed interiorly of the tubular portion 5 and a relatively rigid outer sleeve 9 is disposed exteriorly of the tubular portion 5. These sleeves are preferably made of plastic material, but may be made of metal if desired. The inner diameter of the sleeve 9 and the outer diameter of the sleeve 8 are preferably such as to cause a liquid seal between the sleeve 9 and the tube 5, but the tube 5 may be additionally adhesively secured to the sleeves 8 and 9 by suitable means. The sleeves in the present embodiment are held against outward movement by means of a bead 10 integrally formed on the outer end of the tubular portion 5. This bead additionally serves as a sealing ring to engage a closure cap 11 which is suitably removably secured to the sleeve 9 as by cooperating threaded portions formed respectively on the sleeve and cap. The cap 11 is preferably secured to the neck portion as by means of a stud 12 fastened to the center of the upper wall of the cap and engaged by one end of a chain 13 whose other end is suitably anchored to the sleeve 9. In this construction, the cap 11 is preferably provided with a sealing washer 14 so as to prevent any possible leakage around the stud 12. In the alternative, the bead 10 may be omitted and the sleeves may be otherwise secured to the tubular portion 5 as by friction and/or cement; in which case the tubular portion 5 still preferably extends upwardly to facilitate sealing engagement with the cap. For example, the outer sleeve 9 may be provided with an interior which is tapered from its bottom end upwardly and outwardly toward its upper end, and the external diameter of the inner sleeve 8 may be correspondingly tapered; so that when the tube 5 is positioned between said tapered walls, the locking of the tube into position will be facilitated.

In this embodiment, the filling means is especially adapted for use in bladders intended primarily for holding liquids; and in this connection it is noted that the thermoplastic bladder is especially advantageous for such purposes. For instance, it imparts no taste to liquids, such as water, and is therefore greatly superior to rubber; and likewise such thermoplastic material has characteristics particularly adapted for other fluids.

Referring more particularly to Fig. 2, a variation of the structure above described is shown in which the flexible tubular nipple is designated as 4' and is formed of said thermoplastic material as in the previous embodiment and in so far as the neck portion is concerned, the closure means therefor is identical with the preceding embodiment. In the embodiment of Fig. 2, however, the lower flange is divided into an upper skirt portion 15 and a lower skirt portion 16 providing therebetween an annular recess or slot. In this embodiment, the thermoplastic bladder side wall, such as 17, is provided with an opening and the annular marginal edge surrounding said opening is inserted in the annular recess provided between the skirts 15 and 16. The respectively opposite faces of said thermoplastic side wall are then fused to the respectively corresponding contiguous surfaces of said thermoplastic skirts in the manner above pointed out. It will thus be seen that the skirt 15 is fused to the side wall 17 to provide a first annular seal surrounding the tubular portion 5' and the lower skirt 16 is fused to the side wall 17 to provide a second annular seal surrounding said tubular portion.

Having thus described my invention with particularity with reference to the preferred form of the same and in connection with the preferred method of producing the same, and having referred to certain modifications, it will be obvious to those skilled in the art, after understanding my invention, that other changes and modifications may be made therein without departing from the spirit and scope of my invention, and I aim in the appended claims to cover such changes and modifications as are within the scope of the invention.

Certain features disclosed but not claimed herein form the subject matter of my divisional application Serial No. 595,466, filed May 23, 1945.

What I claim is:

1. In a bladder, the combination of a hollow body having a flexible thermoplastic resinous side wall, a flexible filling nipple having a tubular portion and an integral flexible skirt having a first annular surface area of thermo-active material surrounding said tubular portion and fused to a corresponding annular area of said thermoplastic side wall to provide a first seal, a second flexible skirt integral with said tubular portion and providing a second annular surface area of thermo-active material surrounding said tubular portion and fused to a corresponding annular area of said side wall to provide a second seal, a relatively rigid sleeve secured interiorly of said flexible tubular portion, and a relatively rigid sleeve secured exteriorly of said flexible tubular portion, one of said sleeves being in fluid sealing engagement with said filling nipple and providing means for attaching a closure to said filling means.

2. In a bladder, the combination of a hollow body having a flexible side wall, a filling spout having a rigid neck portion providing means for attaching a closure to said filling means, and an integral flexible skirt extending outwardly from said neck portion adjacent the inner end thereof, said skirt being disposed interiorly of said side wall with its upper surface sealed thereto, a second skirt overlying the inner face of said first skirt and the inner face of a surrounding adjacent area of said side wall and being sealed to corresponding faces of said side wall and first skirt.

3. In a bladder construction for holding liquids, the combination of a hollow body having a side wall of relatively thin flexible thermoplastic material, a filling tube of flexible material having a tubular portion and an integral flange portion on its inner end, said flange having its upper surface secured to the inner surface of said envelope through which said tubular portion extends to thereby provide a first annular seal surrounding said tubular portion, a skirt secured to the under face of said flange portion having an opening in register with the interior of said tube and a periphery disposed beyond said flange to provide an extended marginal edge, the upper face of said marginal edge being secured to the inner surface of said envelope and providing a second annular seal surrounding said flange portion, and relatively rigid tubular means extending axially of and disposed exteriorly and interiorly of and fastened to said tubular portion, said rigid means providing a threaded portion for securing a closure means in sealed relation to said tube.

4. In a bladder structure, the combination of a hollow fabricated body of flexible thermoplastic resinous material, a flexible filling nipple of molded thermoplastic resinous material having a tubular neck and a shoulder flange, said flange being positioned inside said body with its upper face fused to the inner face of said body and said neck extending outwardly through a cooperating hole in the wall of said body, a skirt disposed beneath said flange within said body having an opening in register with the interior of said tube and a marginal edge extending beyond said flange and having an upper face of thermo-active material which is fused to the inner face of said flange and to the inner face of said body throughout an area overlying the said marginal edge of said skirt, whereby said nipple is provided with a double seal, a relatively rigid sleeve held within said tubular neck, and a relatively rigid sleeve surrounding said flexible tubular neck and providing means for attaching a closure cap to said filling means.

5. In a bladder structure, the combination of a hollow body of flexible thermoplastic resinous material, a flexible filling nipple of molded thermoplastic resinous material having a tubular neck and a shoulder flange, said neck being provided with a beaded edge, said flange being fused to said body to provide a fluid seal therewith, a relatively rigid sleeve held within said tubular neck, and a relatively rigid sleeve surrounding said flexible tubular neck with its upper edge disposed beneath said bead, said external sleeve being in fluid sealing engagement with said filling nipple and providing means for attaching a closure cap to said filling means.

6. In a bladder, the combination of a hollow body having a flexible thermoplastic resinous inside wall and an outside fabric wall, a flexible thermoplastic resinous filling nipple having a tubular portion and an integral flexible skirt providing a first annular surface area fused to a corresponding annular area of said side wall to provide a first seal, and a second flexible skirt integral with said tubular portion and providing a second annular surface area of thermo-active material surrounding said tubular portion and fused to a corresponding annular area of said inside wall to provide a second seal, the inner surface of said fabric wall overlying said first annular surface area having a thermo-active surface fused to a corresponding adjacent upper surface of said thermoplastic side wall.

ABRAHAM N. SPANEL.